United States Patent [19]
Pavlov et al.

[11] Patent Number: 6,148,756
[45] Date of Patent: Nov. 21, 2000

[54] METHOD AND MECHANISM FOR DYNAMIC TRIM OF A FAST MOVING, PLANNING OR SEMI-PLANNING SHIP HULL

[75] Inventors: Stanislav D. Pavlov; Serguej A. Porodnikov, both of St. Petersburg, Russian Federation; Clas Norrstrand, Östhammar; Hans Eriksson, Öregrund, both of Sweden

[73] Assignee: MTD Marine Technology Development Ltd., Guernsey, United Kingdom

[21] Appl. No.: 09/376,062

[22] Filed: Aug. 17, 1999

Related U.S. Application Data

[63] Continuation of application No. 08/860,226, filed as application No. PCT/SE95/01583, Dec. 22, 1995, abandoned.

[30] Foreign Application Priority Data

Dec. 23, 1994 [SE] Sweden ................................. 9404503

[51] Int. Cl.[7] ........................................ B63B 1/28
[52] U.S. Cl. .................................. 114/280; 114/275
[58] Field of Search .................................. 114/274, 275, 114/280–282, 145 R, 145 A, 271

[56] References Cited

U.S. PATENT DOCUMENTS

| | | | |
|---|---|---|---|
| 2,257,405 | 9/1941 | Von Burtenach | 114/274 |
| 2,749,869 | 6/1956 | Bush | 114/277 |
| 2,807,228 | 9/1957 | Vandre | 114/145 R |
| 2,890,672 | 6/1959 | Boericke, Jr. | 114/274 |
| 3,693,570 | 9/1972 | Erlykin et al. | 114/274 |
| 3,763,812 | 10/1973 | Rowe | 114/145 A |
| 4,041,885 | 8/1977 | Garcia | 114/282 |
| 4,050,397 | 9/1977 | Vanderleest | 114/274 |
| 4,915,048 | 4/1990 | Stanford | 114/274 |

*Primary Examiner*—Ed Swinehart
*Attorney, Agent, or Firm*—Young & Thompson

[57] ABSTRACT

A mechanism and method for dynamic trim of the floating position of a fast moving, planing or semi-planing ship hull is suggested, wherein a fully submerged hydro foil (1) is pivotally arranged in a stem portion of the ship and continuously adjustable relative to the angle of attack of the hydro foil for generating a wave, the wave having a length, a width and a depth related to the length, the tonnage and the cruising speed of the ship, wherein the hydro foil is designed relative to the wave so that the wave width is controlled by a span width (a), the wave length is controlled by a chord length (b), and the wave depth is controlled by a load (p) of the hydro foil.

8 Claims, 8 Drawing Sheets

METHOD AND MECHANISM FOR DYNAMIC TRIM OF A FAST MOVING, PLANNING OR SEMI-PLANNING SHIP HULL

RELATED APPLICATIONS

This is a continuation of U.S. application Ser. No. 08/860,226, filed Oct. 28, 1997 now abandoned, which was a 371 of PCT/SE95/01583, filed Dec. 22, 1995.

BACKGROUND OF THE INVENTION

The present invention relates to methods and mechanisms for continuous control and trim of the floating position of a fast moving, planing or semi-planing ship hull during acceleration and propulsion at cruising speed.

The need for higher speeds during sea transportation has lately produced a plurality of technical improvements. The primary goal of these improvements has been to reduce the drag during the forward propulsion of the ship, and thus the need for power at higher speeds. Some of these improvements have in common that the wet surface is reduced, and therefore the frictional drag is reduced. "Wet surface" as referred to herein should be understood as the part of the ship hull that is in contact with the water surface or the part that is submerged below the water surface.

Beside the need for higher speeds, there is also a growing need for improved comfort of passengers.

Conventional fast moving and planing typically have the center of gravity positioned aft of the mid section of the ship. This type of hull makes the ship sensitive to pitching, i.e. vertical oscillating movements in the longitudinal extension of the ship hull. These movements may cause the stem to oscillate vertically in an accelerated manner, while the stern remains relatively stationary.

Another problem, that is related to fast moving and planing ships, is the difficulty of achieving an optimal operational angle between the keel or the bottom of the ship hull and the surface of the water. An optimal operational angle or attitude is generally about 5°. Ship hulls that operate with such an operational angle have the center of gravity far behind the mid section of the ship hull and have, therefore, little or non-existent longitudinal stability. In practice, these types of ship hulls are only suitable for racing. Even if a dynamic trim angle of about 5° is attainable in certain designs, it is often impractical due to problems related to navigation, handling of goods and the comfort of passengers.

A technology that, in many aspects, satisfies the requirements of reduced drag and wet surface in this type of ship hulls is the use of support planes or hydro foils which may be submerged or sliding on the water.

The existing systems of submerged support planes are all directed to having a support plane only at the stem of the ship hull and, in the alternative, to having support planes both at the stem and at the stern of the ship hull. The former is only moderately efficient and the latter requires expensive and complex systems, One problem with designing a system having support planes both at the stem and the stern is the trough or the wake between two waves that is generated by the front support plane. This interferes with the function and efficiency of the rear support plane, resulting in increased drag.

PRIOR ART

E.g., Bush teaches in U.S. Pat. No. 2,749,869 the use of fully submerged hydro toils in the stem and stern portions of a ship hull. The foils are supported by struts and pivotable so as to constantly maintaining the entire ship hull at a predetermined elevation above the water surface at cruising speeds.

Likewise, Erlykin et al. suggests in U.S. Pat. No. 3,693,570 the use of dual hydra foils for lifting the ship above water surface at cruising speed. A third hydro foil is suggested and provided substantially amidships, having hydrodynamic properties for taking advantage of the lifting power of the wave or hump created by the forward foil upon acceleration of the ship, At cruising speed, the third hydrofoil is non-operationally supported above water surface.

In U.S. Pat. No. 2,257,405 von Burtenbach also teaches an additional hydro foil amidships which intersects with the wave produced by the forward foil under acceleration to cruising speed. In the ship hull's lifted position at normal cruising speed, the third foil is free of the water. Alternatively, von Burtenbach suggests a third hydro foil which is constantly submerged as the ship hull is elevated above water surface at cruising speed.

The fully elevated ship hull requires major efforts in construction and investments for propulsion, such as long driving rigs for propellers, or passages for lifting water to the intakes of water jet propulsion units, housed in the ship hull. Also, the use of dual hydro foils calls for complex mechanisms for controlling the operation of the aft foil which is subjected to forces applied by the disturbed water flow caused by the forward foil.

In Patent Abstracts of Japan, Vol. 2, No. 9, M-3, abstract of JP, A, 52-121286 (SHINMEIWA KOGYO K.K,), Dec. 10, 1977 (10.12.77) a high speed vessel is provided with a slide plate which is arranged to project forward from the stem portion of a ship hull and is sliding on the water surface during propulsion of the ship. The rearward bottom of the vessel body is curved downward to lift the stern on the hump wave generated upon acceleration. At high speed, the downwardly curved bottom portion may also reduce the pitch angle of the ship.

In Patent Abstracts of Japan, Vol. 2, No. 9, M-3, abstract of JP, A, 52-121287 (SHINMEIWA KOGYO K.K.), Dec. 10, 1977 (10.12.77) a high speed vessel is provided with a slide plate which is arranged to project forward from the stem portion of a ship hull and is sliding on the water surface during propulsion of the ship. The bottom of the vessel is formed with a stepped recess which separates a portion of the bottom from the hump wave generated by the slide plate upon acceleration.

The vessels of the above references suffer from the lack of possibility to affect the wave generated under acceleration and at cruising speed, so that the wave may not, as in the present invention, be controlled to support the ship hull at a desired pitch angle in a broad range of operational speeds.

SUMMARY OF THE INVENTION

The object of the present invention is to provide methods and mechanisms for dynamic trim of a fast moving, planing or semi-planing ship hull, the implementation of which will set aside the mentioned drawbacks in existing trimming systems and promote a comfort ride for passengers at varying speeds, as well as a better exploitation of the propulsion power at high speeds.

Briefly, the invention suggests the arrangement of a fully submerged hydro foil, pivotally supported in a stern portion of the ship hull, the hydro foil having the cross sectional profile of an airfoil and the hydro foil being continuously adjustable relative to the operational angle of attack of the hydra foil during the propulsion of the ship hull, whereby the hydro foil is designed and adjusted to generate a wave (3), the wave having a length, width, and depth controlled at shifting speeds to be adapted to the length and cruising speed of the ship hull so that the generated wave engages the bottom of a stern portion of the ship hull at a controllable angle of intersection ($\alpha$) between the surface of the wave and the bottom of the ship hull, and wherein the hydro foil is designed relative to the wave so that: the length of the wave is controlled by the chord length (b) of the hydro foil; the width of the wave is controlled by the span (a) of the hydra foil; and the depth of the wave is controlled by the load (p) of the hydra foil.

In a modified embodiment, the invention suggests a vertically adjustable trim foil (100) to be arranged in the stern of the ship hull and inserted transversely to the water flow (L) at a controllable depth (A) for generating a pressure rise acting on the bottom portion of the ship hull in front of the trim foil.

These and other objects and details of the invention are more fully described below, reference being made to the attached, schematic drawings of preferred embodiments of the invention.

BRIEF DESCRIPTION OF THE DRAWINGS

FIG. 3b is a partial plan view of the hydro foil of FIG. 3a,

DESCRIPTION OF PREFERRED EMBODIMENTS

Figure 1:
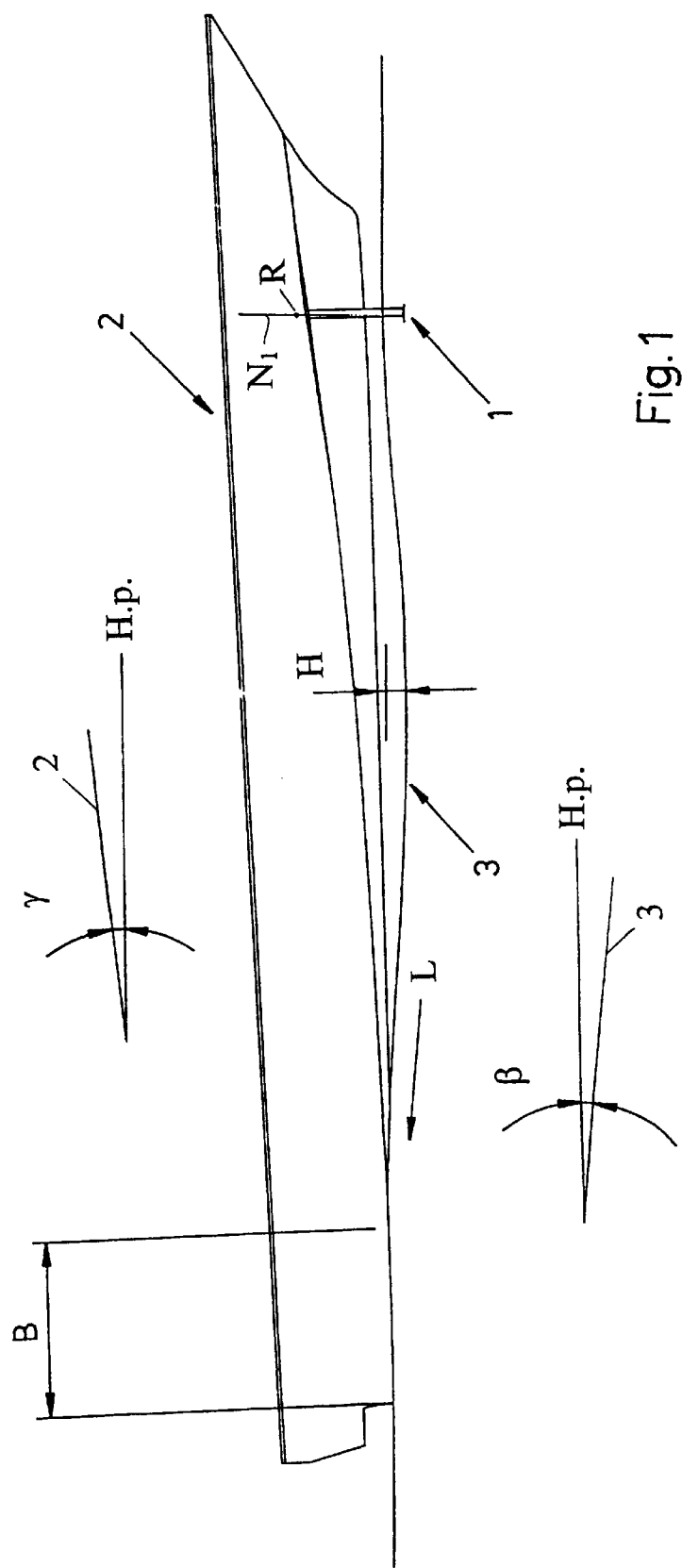
FIG. 1 is a side view of a planing ship hull during propulsion.

The invention is based on the concept of using a fully submerged support plane or hydro foil 1 that is pivotally arranged in a stern portion of a ship hull 2, as shown in FIG. 1. The hydro foil 1 is specifically designed to control the shape of a wave 3 generated by the hydro foil 1 during propulsion of the ship. The wave 3 is controlled to have a predetermined length, width and depth that causes the water to engage the rear portion of the bottom of the ship hull at an advantageous angle of intersection, providing thereby additional and, at varying speeds optimum lift power to the stern of the ship. The ship hull's contact area with the water surface typically corresponds to about 5–20% of the length of the bottom of the ship hull at varying speeds, see B in FIG. 1. By controlling the shape of the wave, it is possible to take full advantage of the lifting powers of the wave to reduce the frictional drag of the ship hull, resulting in lower construction and propulsion costs and less constructional complexity of the ship hull.

The wave 3 is therefore controlled by the following design parameters of the hydro foil 1:

the length of the wave is controlled by the chord length (b) of the hydro foil;

the width of the wave is controlled by the span (a) of the hydro foil; and the depth of the wave is controlled by the load (p) of the hydro foil.

Implementing the above control parameters requires a hydro foil design which is adapted to the ship hull while taking account for the ships tonnage, dimensions and speed so that the attitude shown in FIG. 1 may be achieved during propulsion of the ship hull also at varying speeds. Also, by controlling the length and depth of the wave generated by the hydro foil it is possible to achieve the desired attitude at an earlier stage of acceleration, since the wavers intersection angle with the ship bottom may be manipulated to provide optimal lift power to the ship hull.

According to calculations and tests, the concept of the invention produces the desired technical effect as predicted: a fully submerged, front hydra foil designed to have a lift coefficient Cl and to absorb a substantial load p, generates a wave that may be controlled at varying speeds to lift the ship hull out of the water so that the resulting dynamic angle of attitude, as measured relative to a horizontal plane H.p., is typically about 2.5° to 3°, see angle $\gamma$ in FIG. 1. This typical range of the angle of attitude is often acceptable in aspect of comfort for passengers. The vertical angle of the water flow, as measured relative to the horizontal plane also, is typically 2° to 4° in the area where the generated wave comes to engagement with the bottom of the ship hull, see angle $\beta$ of FIG. 1, Consequently, a total angle of intersection $\alpha$ ($\gamma+\beta$) of 4.5° to 5° may typically be maintained between the water surface 3 and the bottom of the ship hull 2. This is believed to be an optimal angle of intersection within a broad speed interval.

In addition, the generated wave is controlled by the sectional profile and attack angle of the hydra foil to provide a wake or trough of increased free height distance between the bottom of the ship hull and the water surface, which corresponds to the depth H of the wave.

It has been shown that the net reduction of drag of the ship typically amounts to about 35% or more of the required power to run the ship at desired cruising speed. Such reduction obviously leads to a substantial reduction of costs for construction and propulsion.

In addition, extensive tests have shown that continuous control of the setting of the attack angle of the hydra foil results in a significantly improved handling of the ship in rough sea.

The hydra foil may thus be controlled relative to its operational angle, i.e. attack angle, by turning a pair of parallel strut members in the outer ends of which the hydro foil is attached. The inner ends of the strut members are pivotally attached to the ship hull, see FIG. 2. In ship designs having a plurality of ship hulls, separate hydro foils may be attached to a stem portion of each ship hull. The above mentioned pivoting of the strut members should be about −4° to about +5° as measured counter clockwise relative to a normal $N_1$ to the water surface through the point of rotation R in the ship hull of FIG. 1.

Figure 2:
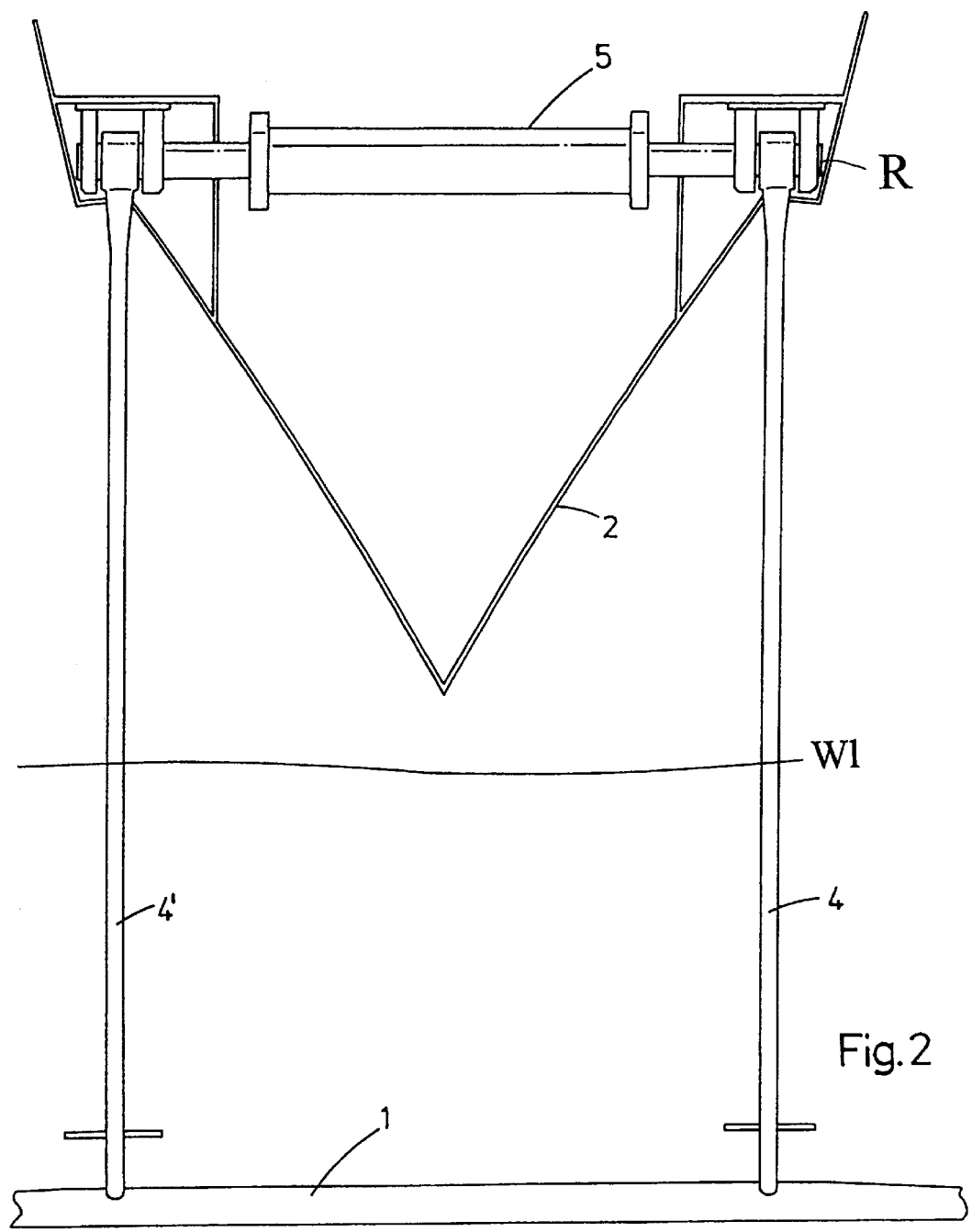
FIG. 2 is a cross sectional view of a stem portion of the ship hull of FIG. 1.

With reference to FIG. 2 there is shown a cross sectional view of a stem portion of the planing or semi-planing ship hull 2 having a hydro foil 1, according to a preferred embodiment of the present invention. The hydro foil 1 is supported in the outer ends of two parallel strut members 4,4' that are pivotally attached to the ship hull 2. The inner ends of the strut members 4,4' are non-rotationally attached to an axle S which is driven for rotation by suitable hydraulic, electric-hydraulic or mechanical driving mechanisms. The driving mechanism per se may be conventional and is not further shown in the drawings. The rotation of the strut members 4,4', and accordingly the attack angle of the hydro foil 1, is continuously controlled in response to the pitch or vertical movements in longitudinal direction of the ship hull. These movements may be detected by a gyro, e.g, and transmitted to the driving mechanism for rotating the axle 5 in response to the vertical movements of the ship.

Figure 3A:
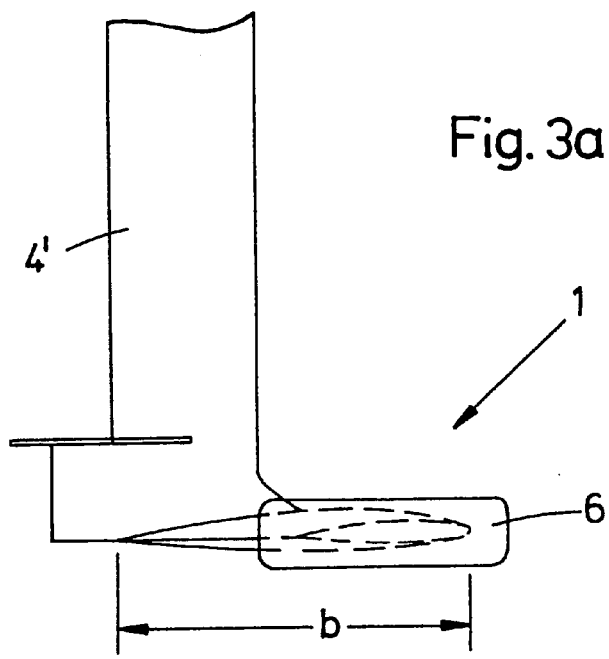
FIG. 3a is an end view of a hydro foil according to the present invention.
Figure 3B:
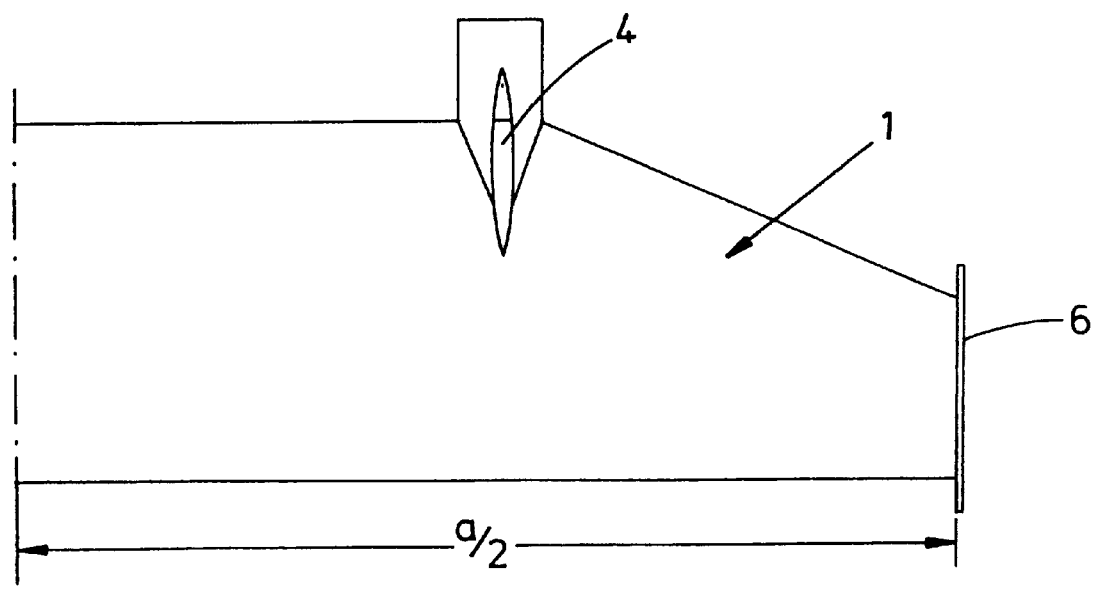

FIGS. 3a and 3b show an embodiment of the hydro foil 1. The end view of FIG. 3a shows that the hydro foil 1 is designed to have the cross sectional shape of an air foil. That is, it has the shape of a wing having an arching upper side and a relatively planar under side and is therefore providing a lift force when it is forced through the water. The chord length (b) of the hydro foil 1 is determined as mentioned above and as is further described below to control the length of the generated wave, which is adapted to the design parameters of the ship hull.

The plan view of FIG. 3b shows that the chord length (b) may be reduced in the direction of tho end portion of the hydro foil 1. In this way, the generated wave is shaped to have a trough or depth which is gradually reduced in the directions toward the areas of the outer boundaries thereof. This provides a water flow that is substantially free of interfering turbulence in these areas. Also, by the reduced chord length, the trough of the generated wave is refilled at the stern portion of the ship hull substantially without generating interfering turbulence or introduction of air in the water. A vertical fin 6 may be attached to each end of the hydro foil 1 to prevent turbulence at the outer edges thereof, caused by the pressure difference between the planar under aide and the arched upper side of the hydro foil 1.

The design of the hydro foil 1 may be determined from calculation methods similar to those used in air foil design. The attack angle of the hydro toil, the required lift force or the load (p), and the velocity V of the water flow over the wing profile may be used in iterative calculation methods to determine the span (a) and the chord length (b) of the hydro foil 1, which in turn are used in calculations to determine the controllable length, depth and width of the generated wave 3. The wing profile of the hydro foil affects the gradient of velocity of the water flow which passes the profile. In the invention, this effect is used to generate a wave which is controlled for dynamic trim of the floating position of a ship hull designed to have a tonnage and a cruising speed.

With reference to FIGS. 4–7 calculated examples are illustrated to show the correlation of design parameters by which the inventive methods and mechanisms are implemented.

Figure 4:
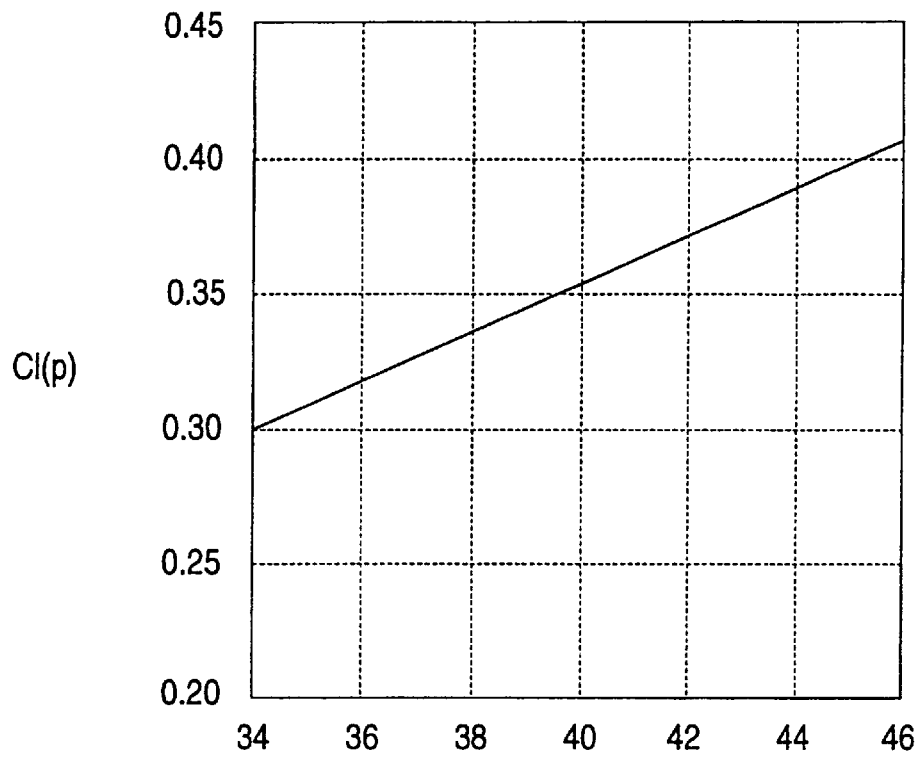
FIG. 4 is a graphic illustration of the lift coefficient (Cl) of the hydro foil as a function of the load (p) in the described example of calculations.

FIG. 4 shows a graph, illustrating the lift coefficient Cl as a function of the load (p). In the illustrated example, a load (p) in the order of 34–46,000 kilopond and a cruising speed or velocity V of 26 knots is anticipated. It is further assumed, that the density of water ρ is 1.025 g/cm³ (salt water), and that the required lift force F is the product of the gravitational constant 9.81 and the subject load. Solving the equation below for the above load interval results in the graph of FIG. 4:

Equation 1:

$$Cl(p) \equiv \frac{F(p)}{\frac{\rho \cdot v^2}{2} \cdot S}$$

wherein S is the area of the hydro foil. In this example, the area S is 3.234 m², the span (a) is 4.2 m and the chord length (b) is 0.77 m. In the example, it is assumed that the flow of water over the profile of the hydro foil is free from air and that the hydro foil is submerged to the relative depth of the inverse of the chord length (b), i.e, 1.0/b.

By using the above parameters, the angle of intersection α between the wave and the bottom of the ship hull, as well as the wave depth Hw may be determined at different loads. Characteristics of the above hydra foil are illustrated in the graphs of FIGS. 5 and 6.

Figure 5:
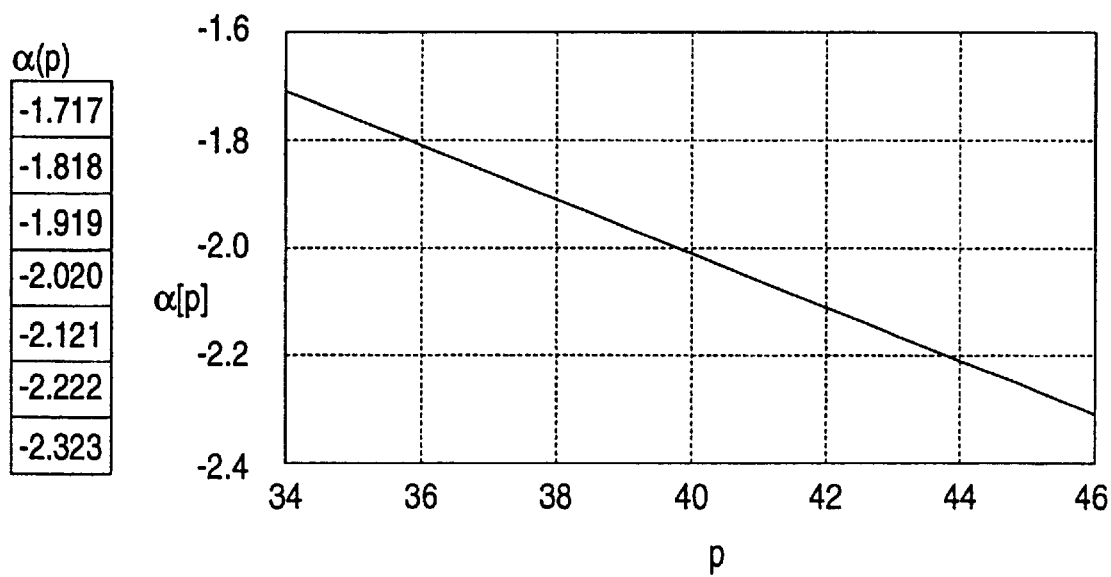
FIG. 5 is a graph illustrating the depth of the generated wave.
Figure 6:
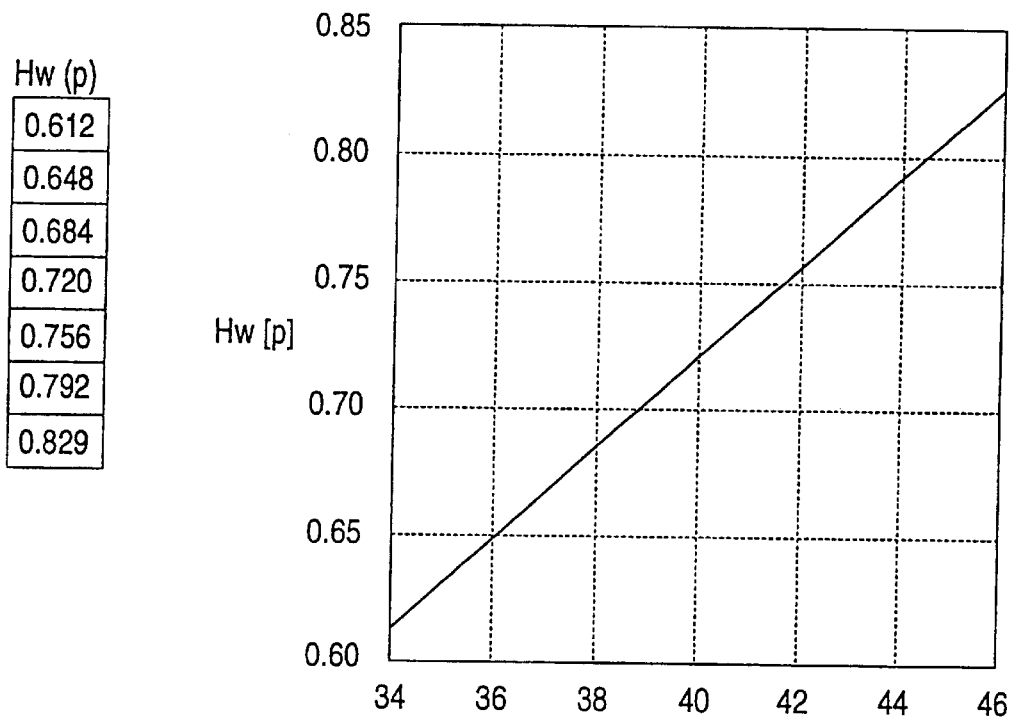
FIG. 6 is a graph illustrating the angle of intersection in the area where the wave contacts the bottom of the ship hull.

FIG. 5 relates to the angle of intersection α between the wave and the bottom of the ship hull at different loads whereby the table values of α(p) may be obtained from the equation below:

Equation 2:

$$\alpha(p) \equiv .75 \cdot \frac{Cl(p)}{(Fr)^{2 \cdot v}} \cdot \left[ e^{\frac{-h}{Fr^{2 \cdot v}}} + \frac{.5}{\lambda} \cdot [Fr^{2 \cdot v} - 2] \right] \cdot \cos\left[\frac{I}{Fr^{2 \cdot v}}\right] \cdot 57.3$$

wherein p is the load (34–46,000 kilopond);
Cl is the lift coefficient of the hydro foil 1;
Fr is the Froude value of the hydro foil 1;
v is the kinematic viscosity as expressed by:

$$v \equiv e^{\frac{-73}{\lambda^2}}$$

h is the relative depth to which the hydro foil 1 is submerged in the water during propulsion of the ship;
λ is the aspect ratio of the hydro foil 1;
I is a relational value, obtained by dividing the distance between the support plane 1 and a center point of the wet surface with the chord length (b);
e (2,718 . . . .) is the natural logarithm value.

FIG. 6 relates to the wave depth Hw as dependent on the load (p), whereby the table values Hw(p) are obtained by solving the equation below:

Equation 3:

$$Hw(p) := \left[ e^{Fr - \frac{h}{2 \cdot v}} + \frac{.5}{\lambda} \cdot [Fr^{2 \cdot v} - 2] \right] \cdot Cl(p)$$

Figure 7:
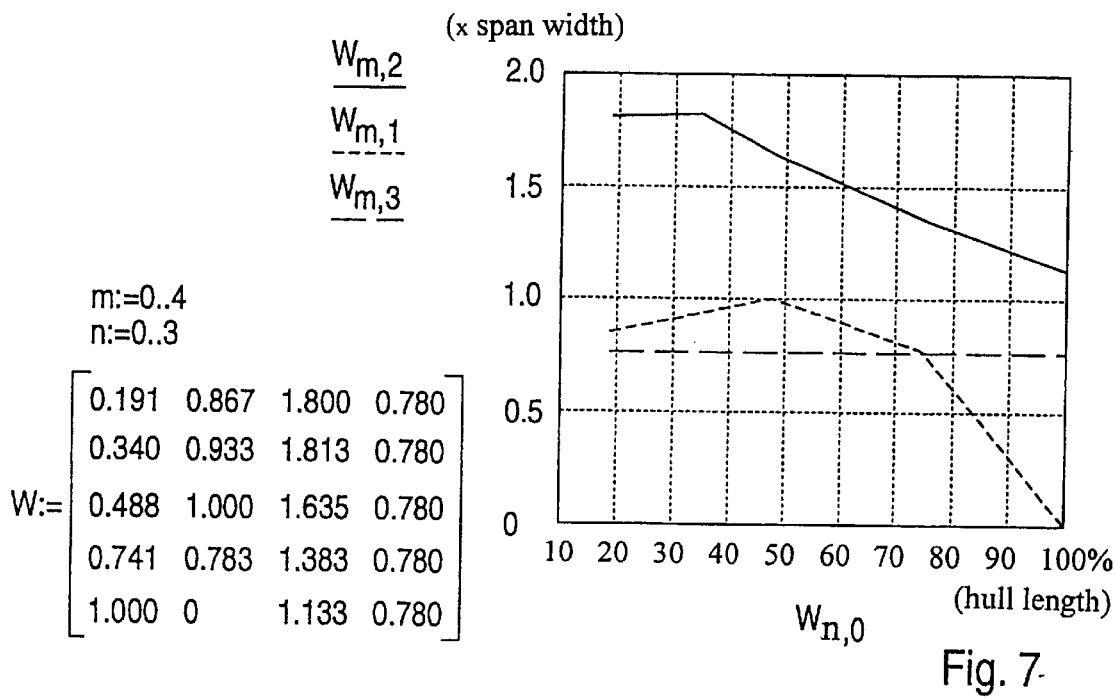
FIG. 7 is a graph illustrating the shape of the induced wave showing the inner and outer points of intersection with an imaginary, horizontal water surface.

FIG. 7 is a graph illustrating the shape of the induced wave as seen from above. The horizontal axis shows the percentage length of the ship hull as seen from the hydro foil 1 towards the stern plate, and the vertical axis shows the propagation of the wave sideways relative to half the span width of the hydro foil 1. Half the span width is indicated as 1 in the graph, and 0 represents the center line of the ship hull. The dotted line Wm,1 shows the inner intersection points between the wave and an imaginary horizontal and stagnant water surface, The solid line Wm,2 shows the outer intersection points between the wave and the horizontal water surface.

While here has been suggested a method for calculation of the constructional layout of the hydro foil 1, a method which at this moment is considered to support the best mode for carrying out the invention, it should be understood that the disclosed arithmetic values are merely examples to guide the man of skill in the art through the calculations and by which it is shown, that the desired technical effect is possible to calculate and is therefore predictable and reproducible.

In a modified embodiment, the advantages of the present invention may be enhanced when the hydro foil 1 is combined with a trim plane or trim foil arranged in a stern portion of the ship hull. It has been shown, that a trim foil as disclosed below may significantly reduce drag and energy consumption.

Figure 8:
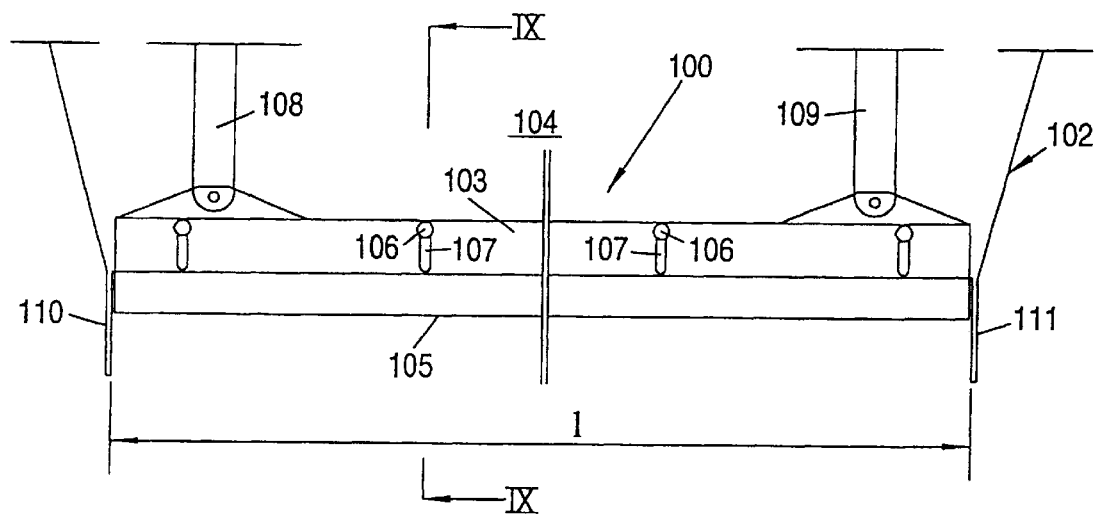
FIG. 8 is a view of the stern portion of a ship hull, showing a trim foil according to one aspect of the present invention.
Figure 9:
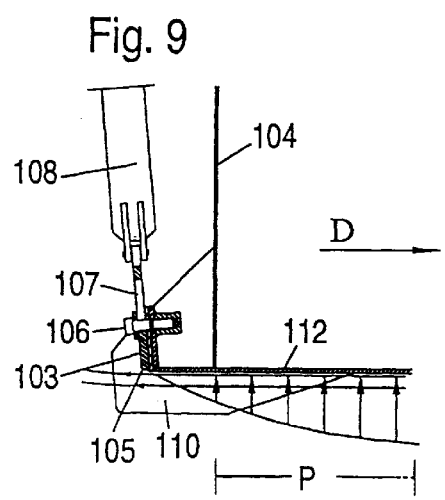
FIG. 9 is a cross sectional view along the line IX—IX of FIG. 8.
Figure 10:
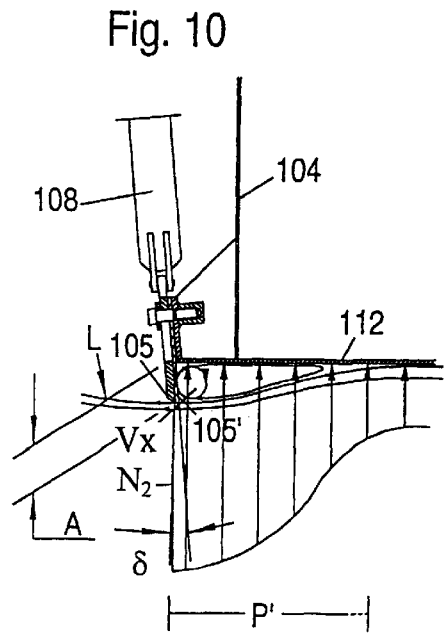
FIG. 10 is a side view of the trim foil in a submerged operational mode.

FIGS. 8, 9 and 10 show an embodiment of the mechanism of the present invention that is generally referred to by the reference numeral 100. The mechanism is mounted at the lower end of the stern of the ship hull. The illustrated mechanism 100, that is from here on referred to as the trim foil 100, comprises a substantially planar disc 103 which is moveably attached to a stern plate 104. The disc 103 has a lower, longitudinal edge 105, which is inserted to a controlled depth in the water flow upon a downward, substantially vertical and recta linear movement of the disc 103. The disc 103 is guided in its movement by guides 106, sliding within slots 107 disposed in the disc 103. The movements of the disc 103 may be generated by hydraulic or electric-hydraulic or mechanical driving mechanisms that are not further disclosed and may be conventional. The movements are transferred to the disc 103 by a couple of bars 108, 109.

The disc 103 has a length 1 that substantially corresponds to the width of the lower edge of the stern plate 104. The disc 103 may preferably be split longitudinally midways into two halves, so that each half is separately controllable to be submerged to a desired depth in the relative water flow below the bottom of the ship hull. The movements of each half of the disc 103 may therefore be synchronized or independently controlled, respectively, to counteract and to reduce both pitching and rolling movements of the ship hull. Fins 110, 111 are attached to the ship hull near both extreme ends of the disc/discs 103. The fins 110, 111 extend downwards from the hull bottom, and longitudinally forward from the stern portion so that the disc 103 is confined between the fins 110, 111. The fins 110, 111 have a vertical dimension that at least corresponds to the maximum depth of which the disc/discs 103 may be inserted in the relative water flow. The longitudinal dimension of the fins 110, 111 preferably exceeds said maximum depth. In the alternative, the fins 110, 111 may be attached to the extreme ends of the disc 103.

FIG. 9 shows the trim foil 100 in a rest position wherein the edge 105 is disposed so that it does not extend vertically below the bottom 112 of the ship hull, The operation of the fin 110 is described below with reference to FIG. 10 of the drawings. During propulsion in the direction of the arrow D of FIG. 9, the bottom of the ship hull is subjected to a load P which gradually reduces towards the stern of the ship hull. This is illustrated schematically in FIG. 9 by the arrows P which are directed vertically against the ship hull.

FIG. 10 shows the trim foil 100 in an operational position wherein the trim foil is lowered to a maximum, so that the edge 105 protrudes below the bottom 112 of the ship hull at a maximum insertion depth A. In the lowered position, the trim foil 100 presents a forward facing surface 105' that extends transversely to the direction of the relative water flow, whereby a volume of the water flow is slowed down by the drag of the forward facing surface 105'. The fins 110, 111 serve to prevent the water volume that has been slowed down from escaping the extreme end areas of the trim foil 100. The water volume thus caught between the fins 110, 111 is exposed to a compression or increase of pressure, indicated in FIG. 10 by the arrows P'. In the submerged, operational position the trim foil 100 obviously provides an increased drag during propulsion of the ship. However, it has been shown in models and full scale tests that the additional drag is not only negligible, but also outweighed by the overall improved energy efficiency achieved due to the trim foils advantageous effect on the floating position or attitude of the ship under propulsion. Such tests have indicated that the depth A, that is the maximum insertion depth of the edge 105 of the trim foil 100 advantageously should account for about 3% of the total length of the trim foil 100, and preferably should, at a maximum, be about 2.7% of this length.

FIGS. 9 and 10 illustrate a schematic of an embodiment of the trim foil 100 that is arranged to slope at an angle $\delta$ relative to a line $N_2$ that is the normal to the bottom of the ship hull. Tests have revealed that the angle $\delta$ preferably should be within the interval of about 3° to plus/minus 5°. I.e., with reference to FIG. 10, the interval should be within −2° to +8° as measured anti-clockwise relative to the normal $N_2$ of FIG. 10.

By introducing a surface transversely to the relative water flow L immediately behind the bottom of the ship hull, a main vortex Vx is generated. The vortex Vx has a velocity component that is directed upwardly and forwardly relative to the bottom of the ship hull. A plurality of minor whirls are also generated but are not shown in the drawings. The main vortex Vx is confined between the fins 110, 111 and rotates in front of the surface 105' to create a water flow that is directed upwardly/forwardly under the bottom of the ship hull. The vortex Vx provides a zone of increased pressure which is acting on the bottom surface 112 as illustrated with arrows P' in the schematic shown in FIG. 10. The magnitude of the pressure in the zone of increased pressure depends on the velocity of the ship and the insertion depth of the submerged portion of the trim foil 100.

From the above it is clear, that adjustments of the insertion depth of the submerged trim foil 100 would directly affect the floating position of a ship under propulsion at cruising speeds.

Extensive tests have thus shown the above characteristics relating to the operative insertion depth and slanting position of the trim foil 100, Similar tests have shown that the drag generated by a trim foil 100 designed according to the present invention, is negligible. The test results show an increased effectiveness that may be calculated and utilized for all ship sizes that are operated at an FNL value higher than 0.6. The FNL value refers to the dimension-free Froude value which takes the constant of gravity into account and depends on the length of the ship and the speed of propulsion, and is familiar to the designer of fast moving, planing or semi-planing ship hulls.

Figure 11A:
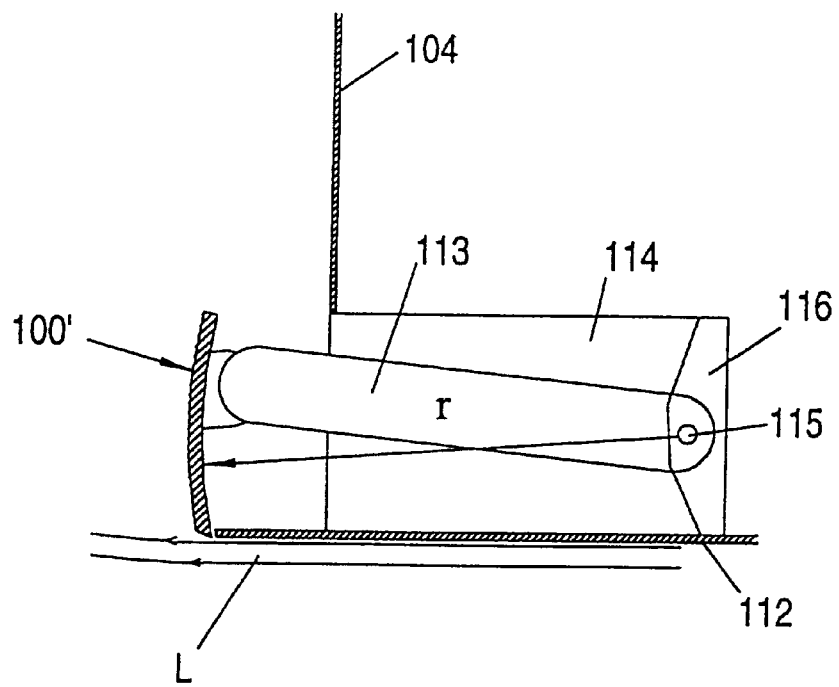
FIG. 11a and 11b are side views of an alternative embodiment of the trim foil.
Figure 11B:
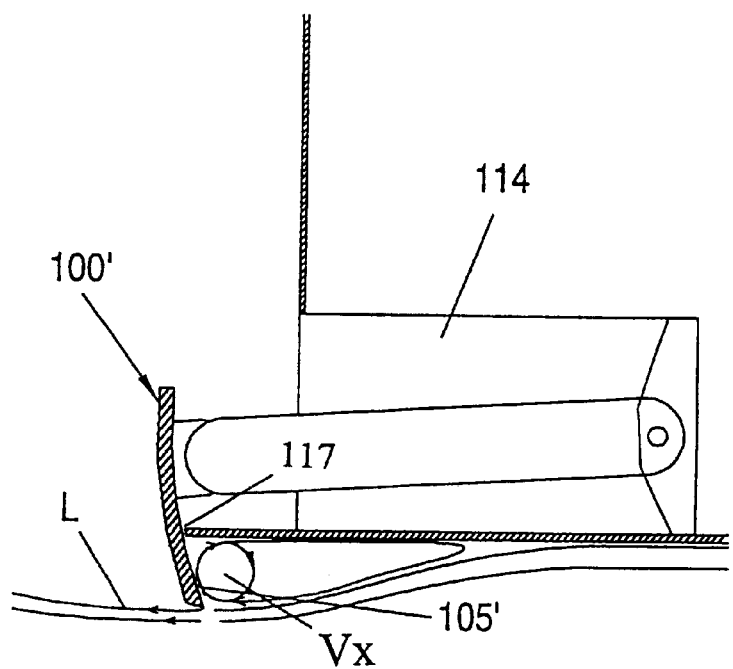

With reference to FIGS. 11a and 11b, a schematic of a modified trim foil 100' of the present invention is shown. In this embodiment, a trim foil 100', having a bow shaped cross section and a concave surface 105' that is turned in the direction of movement of the ship hull, is secured to a peripheral end of a pivoting rod member 113 for transferring a peripheral movement to the trim foil 100'. In this way, the rod member 113 may be mounted into a recess 114 disposed in the stern plate 104 of the ship. Several rod members 113 may be required to provide stable pivoting attachment and movement of the trim foil 100'. The trim foil 100' is movable for insertion to a maximum depth in the relative water flow about a pivot point 115, and formed with a radius r. The pivot point 115 may be attached to the sides or to a bottom 116 of the recess 114. The rod member 113 is controlled to raise or lower the trim foil 100' to a desired insertion depth, as shown in FIG. 11b. The movement may be performed by hydraulic or electric-hydraulic or mechanical driving mechanisms not further shown. E.g., a piston/cylinder unit (not shown in the drawings) may be attached within the recess 114 or on the outside of the stern plate 104 to operate with the rod member 113 for controlling the movements of the trim foil 100'. The modified trim foil 100' is designed in accordance with the trim foil 100 in aspects of length, slope angle and insertion depth, Similar to the trim foil 100, the trim foil 100' cooperates with fins (not shown) attached near both ends of the foil 100'. Also, the foil 100' preferably is divided into two halves which are individually movable by separate driving mechanisms.

It should here be pointed out, that any gap 117 that may arise between the stern portion of the ship hull and the trim foil 100' in all applications should be kept to a minimum to prevent water from escaping through the gap, which would lower the operative effect of the zone of increased pressure that is generated in front of the trim foil 100'.

Figure 12:
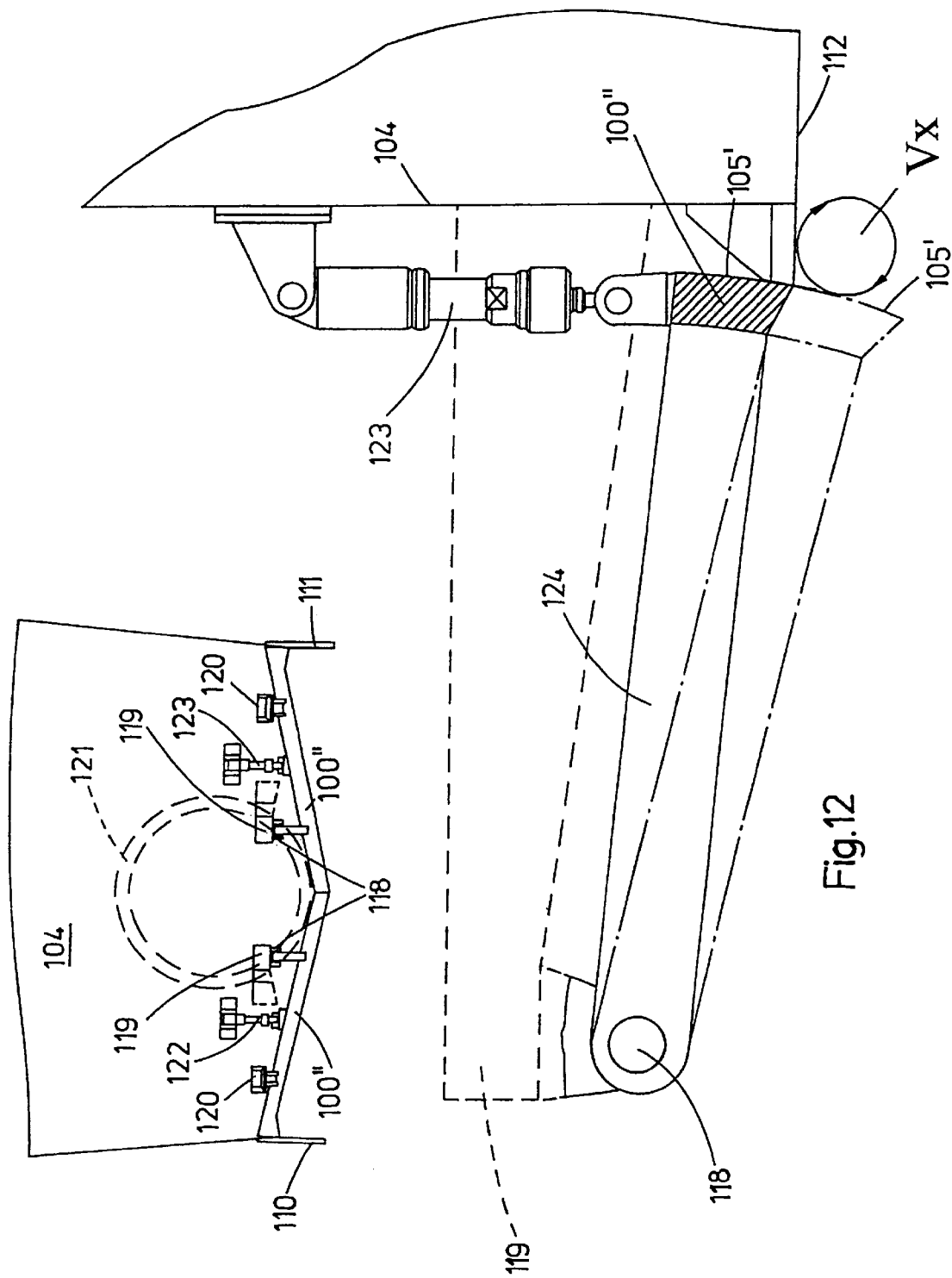
FIG. 12 is a side view of another alternative embodiment of the trim foil.

With reference to FIG. 12, a further modification of the trim foil of the present invention is shown.

In this alternative embodiment, the trim foil 100" comprises a bow shaped or convex surface 105' that is turned in the moving direction of the ship. A rod 124 is adapted to transfer peripheral movements to the surface 105' by being pivotally attached to a pivot point 118. The trim foil 100" is shown comprising two separate halves that are each pivotally attached to inner and outer support members 119 and 120, respectively (the support member 119 is shown in broken lines in the drawing). In order to provide the required space for a water jet or propeller rig of a drive unit, the inner support members 119 may project from the stern plate 104 at an angle. Both halves of the trim foil 100" are separately controlled by pivotally attached piston/cylinder units 122 and 123, respectively, These units 122, 123 shift the trim foil 100" in an arched path about the pivotally supported end portion of the rod 124. It is clear that the two separately controlled halves of the trim foil 100" may continuously be shifted to provide counter force to rolling movements of the ship. By coordinating the operation of both halves of the trim foil 100", the pitch movements in the longitudinal direction of the ship may be reduced.

The operation of the trim foils may in all modifications thereof be automatically controlled to counter act the pitch and roll movements of the ship, which are detected by a gyro, e.g. The gyro detection is then converted into control signals for the driving mechanisms of the trim foils.

In the latter modified embodiment of FIG. 12, the design parameters are determined such that the bow shaped surface 105' of the trim foil 100" is operative to meet the above outlined characteristics of length, slope angle and insertion depth.

The trim foil of the present invention enables continuous, dynamic trim of a fast moving ship hull while counter acting roll and pitch movements during the propulsion of the ship. Some of the advantages may be summarized as follows:

Quick response and low energy consumption;
High efficiency of the trim energy provided;
Low mechanical load on moving parts;
No disturbance of a reversed water jet.

By combining the concept of dynamic trim, implementing the above design parameters for controlling the length, width and height of a wave generated by a fully submerged, pivotally supported hydro foil in a stem portion of the ship hull, with the trim foil inserted transversely to the relative water flow in a stern portion of the ship hull there is achieved a highly effective method for reducing drag and wet surface.

Additionally, by controlling the attack of the hydro foil so that its operative angle and resulting lift force is continuously adjusting the wave in adaptation to the speed of the ship during acceleration and cruising, the vertical movements of the ship may be minimized while maintaining an optimal floating position at varying speeds and also in rough sea. The method may be implemented for ships having one ship hull or several ship hulls, and may preferably be used with catamarans.

What is claimed is:

1. A method for dynamically controlling a trim angle of a fast moving, planing or semi-planing ship hull under propulsion at cruising speed, the ship hull having a length and a load, the method comprising the steps of:

providing a hydrofoil with a sectional profile of a wing, the hydrofoil having a span width, a chord length and a lift, such that the wing-shaped hydrofoil, when forced through water provides a lift force which is dimensioned relative to the load of the ship for balancing a fore part of the ship above the water at cruising speed;

arranging the hydrofoil pivotally adjustable and fully submerged in a stem portion of the ship hull, and controlling an angle of attack of the hydrofoil relative to water flow when the ship is under propulsion, thereby controlling a submersion depth of the hydrofoil by adjusting its angle of attack in response to a detected trim position of the ship;

generating a wake by the submerged hydrofoil at cruising speed, the wake having a length related to the chord length, a width related to the span width, and a depth related to the load, balanced by the hydrofoil, and adjusting the hydrofoil to achieve the submersion depth, so that the chord length, span width and lift of the hydrofoil is effective, through said adjustment of the attack angle, for manipulating the wake to intersect with a stern portion of a bottom of the ship hull at an intersection angle, the wake balancing the ship load in said stern portion of the ship, while supporting the stern portion at a height related to the submerged depth of the hydro-foil.

2. The method of claim 1, wherein the wake is manipulated by controlling the length and depth of the wake, to move a point of intersection with the ship bottom in longitudinal direction of the ship in response to the detected trim position.

3. The method of claim 1, wherein the wake is manipulated by controlling the length and depth of the wake, to adjust the intersection angle with the ship bottom in response to the detected trim position.

4. The method of claim 1, wherein the hydrofoil at cruising speed is arranged at? a depth of submersion corresponding approximately to an inverse of the chord length, ? i.e. 1.0 through chord length.

5. The method of claim 1, wherein the hydrofoil is arranged in the stem portion of the ship hull for generating the wake, the length and depth of the wake being controllable to intersect with the bottom of the ship hull in a stern portion corresponding to about 5 to 25% of a total length of said bottom.

6. The method of claim 1, wherein the angle of attack of the hydrofoil is adjustable within a range of about 10°.

7. A method for dynamically controlling a trim angle of a fast moving, planing or semi-planing ship hull under propulsion at cruising speed, the ship having a length and a load, the method comprising the steps of:

providing a hydrofoil with a sectional profile of a wing, the hydrofoil having a span width, a chord length and a lift, such that the wing-shaped hydrofoil, when forced through water provides a lift force which is dimensioned relative to the load of the ship for balancing a fore part of the ship above the water at cruising speed;

arranging the hydrofoil pivotally adjustable and fully submerged in a stem portion of the ship hull, and controlling an angle of attack of the hydrofoil relative to water flow when the ship is under propulsion, thereby controlling a submersion depth of the hydrofoil by adjusting its angle of attack in response to a detected trim position of the ship;

generating a wake by the submerged hydrofoil at cruising speed, the wake having a length related to the chord length, a width related to the span width, and a depth related to the load, balanced by the hydrofoil, adjusting the hydrofoil to achieve the submersion depth, so that the chord length, span width and lift of the hydrofoil is effective, through said adjustment of the attack angle, for manipulating the wake to intersect with a stern portion of a bottom of the ship hull at an intersection angle, the wake balancing the ship load in said stern portion of the ship, while supporting the stern portion at a height related to the submerged depth of the hydro foil, arranging, in a stern portion of the bottom of the ship, a surface transversely insertable in the relative water flow when the ship is under propulsion, and controlling an insertion depth of the surface for generating a water volume of increased pressure acting on the bottom of the ship hull.

8. The method of claim 7, wherein the surface is vertically insertable from the bottom of the ship to a maximum insertion depth corresponding to about 3% of the total length of the surface.

* * * * *